(12) United States Patent
Lin et al.

(10) Patent No.: US 7,911,623 B2
(45) Date of Patent: Mar. 22, 2011

(54) FABRY-PEROT PIEZOELECTRIC TUNABLE FILTER

(75) Inventors: Pinyen Lin, Rochester, NY (US); Peter M. Gulvin, Webster, NY (US); Yao Rong Wang, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 478 days.

(21) Appl. No.: 11/890,575

(22) Filed: Aug. 7, 2007

(65) Prior Publication Data

US 2009/0040616 A1    Feb. 12, 2009

(51) Int. Cl.
*G01B 9/02* (2006.01)
(52) U.S. Cl. .......................... 356/480; 356/519; 356/454
(58) Field of Classification Search .................. 356/454, 356/480, 519
See application file for complete search history.

(56) References Cited

U.S. PATENT DOCUMENTS

| | | | | |
|---|---|---|---|---|
| 4,859,060 A | * | 8/1989 | Katagiri et al. | 356/454 |
| 5,550,373 A | * | 8/1996 | Cole et al. | 356/454 |
| 5,909,280 A | * | 6/1999 | Zavracky | 356/454 |
| 6,295,130 B1 | * | 9/2001 | Sun et al. | 356/454 |
| 2006/0132787 A1 | | 6/2006 | Mestha et al. | |
| 2006/0221346 A1 | | 10/2006 | Mestha et al. | |
| 2006/0221450 A1 | | 10/2006 | Wang et al. | |

OTHER PUBLICATIONS

U.S. Appl. No. 11/319,276, filed Dec. 29, 2005, Lin et al.
U.S. Appl. No. 11/319,389, filed Dec. 29, 2005, Wang et al.
U.S. Appl. No. 11/405,774, filed Apr. 18, 2006, Lin et al.
U.S. Appl. No. 11/406,030, filed Apr. 18, 2006, Lin et al.
U.S. Appl. No. 11/535,382, filed Sep. 26, 2006, Mestha et al.

* cited by examiner

*Primary Examiner* — Hwa S. A Lee
(74) *Attorney, Agent, or Firm* — Fay Sharpe LLP

(57) ABSTRACT

Disclosed is a microelectromechanically tunable Fabry-Perot device and method of manufacturing tunable Fabry-Perot device and method of manufacturing. The F-P device comprises a first and second substrate which has partially reflective planar surfaces, and the partially reflective planar surfaces are separated by a predetermined separation distance and aligned to provide a F-P cavity, where one or more piezoelectric members are adapted to displace the first and second substrates when an electric field is applied.

8 Claims, 6 Drawing Sheets

FABRY-PEROT PIEZOELECTRIC TUNABLE FILTER

BACKGROUND

This disclosure relates to Fabry-Perot (F-P) tunable filters. Specifically, this disclosure provides a piezoelectric F-P tunable filter.

MEMS (Micro Electro Mechanical Systems) F-P tunable filters are used for many applications including displays and color sensing. Conventional electrostatic actuators, as used in conventional F-P tunable filters, have some disadvantages, such as not being stable after pulling down one third of the air gap. Another disadvantage associated with conventional electrostatic actuators is they require large areas to generate the necessary force, which reduces the production yield. Finally, another disadvantage associated with conventional electrostatic actuators may require an additional stopper or dielectric layer to prevent electrical shorting from externally generated vibration.

INCORPORATION BY REFERENCE

U.S. patent publication No. 2006/0221450, published Oct. 5, 2006, by Wang et al., entitled "DISTRIBUTED BRAGG REFLECTOR SYSTEMS AND METHODS."

U.S. patent application Ser. No. 11/405,774, filed Apr. 18, 2006, by Pinyen Lin et al., entitled "FABRY-PEROT TUNABLE FILTER USING A BONDED PAIR OF TRANSPARENT SUBSTRATES."

U.S. patent publication No. 2006/0132787, published Jun. 22, 2006, by Mestha et al., entitled "FULL WIDTH ARRAY MECHANICALLY TUNABLE SPECTROPHOTOMETER."

U.S. patent publication No. 2006/0221346, published Oct. 5, 2006, by Mestha et al., entitled "TWO-DIMENSIONAL SPECTRAL CAMERAS AND METHODS FOR CAPTURING SPECTRAL INFORMATION USING TWO-DIMENSIONAL SPECTRAL CAMERAS."

U.S. patent application Ser. No. 11/319,276, filed Dec. 29, 2005, by Pinyen Lin et al., entitled "MEMS FABRY-PEROT TUNABLE FILTER FOR SPECTRAL IMAGER."

U.S. patent application Ser. No. 11/406,030, filed Apr. 18, 2006, by Pinyen Lin et al., entitled "MEMS FABRY-PEROT TUNABLE FILTER USING TRANSPARENT SUBSTRATES."

U.S. patent application Ser. No. 11/319,389, filed Dec. 29, 2005, by Yao Rong Wang et al., entitled "RECONFIGURABLE FABRY-PEROT SPECTRAL FILTER."

U.S. patent application Ser. No. 11/535,382, filed Sep. 26, 2006, by Lalit K. Mestha et al., entitled "MEMS FABRY-PEROT INLINE COLOR SCANNER FOR PRINTING APPLICATIONS USING STATIONARY MEMBRANES."

BRIEF DESCRIPTION

In accordance with one aspect of this disclosure, a microelectromechanically tunable Fabry-Perot device is disclosed. The microelectromechanically tunable Fabry-Perot device comprises a first substrate comprising a partially reflective planar surface, and one or more piezoelectric members attached to the first substrate; and a second substrate comprising a partially reflective planar surface, wherein the first substrate partially reflective planar surface and the second substrate partially reflective planar surface are separated by a predetermined separation distance and aligned to provide a Fabry-Perot cavity, and the one or more piezoelectric members are adapted to displace the first substrate when an electric field is applied to the one or more piezoelectric members.

In accordance with another aspect of this disclosure, a Fabry-Perot filter system is disclosed. The Fabry-Perot filter system comprises an illumination source; an image to be spectrally measured; and a piezoelectric tunable Fabry-Perot filter, wherein the illumination source directs light at the image to be spectrally measured and the image reflects the illumination light to the piezoelectric tunable Fabry-Perot filter.

In accordance with another aspect of this disclosure, a xerographic machine is disclosed. The xerographic machine comprises one or more piezoelectric tunable Fabry-Perot filters; one or more photodetectors; one or more lenses; one or more illumination sources; and one or more photoreceptor devices for receiving an electrostatic image, wherein the one or more illumination sources direct light on one or more images electrostatically marked on the photoreceptor device, part of the directed light is reflected through one or more lenses to one or more respective piezoelectric tunable Fabry-Perot filters, and the one or more respective piezoelectric tunable Fabry-Perot filters are controlled with an electrical field to transmit a predetermined spectrum of light to one or more respective photodetectors.

BRIEF DESCRIPTION OF THE DRAWINGS

FIG. 3 illustrates a silicon wafer according to an exemplary embodiment of this disclosure;

DETAILED DESCRIPTION

As briefly discussed above in the Background section of this disclosure, provided is a F-P piezoelectric tunable filter for use in, but not limited to, color sensing and color display applications. This disclosure describes a color printing application of a piezoelectric F-P tunable filter, however, other applications unrelated and related to printing are within the scope of this disclosure and claims. These other applications may include handheld battery operated devices, color filters, LCDs, MEMS displays, hyper spectral imagers, "fancy" colored glass and chemical analysis.

Figure 1:
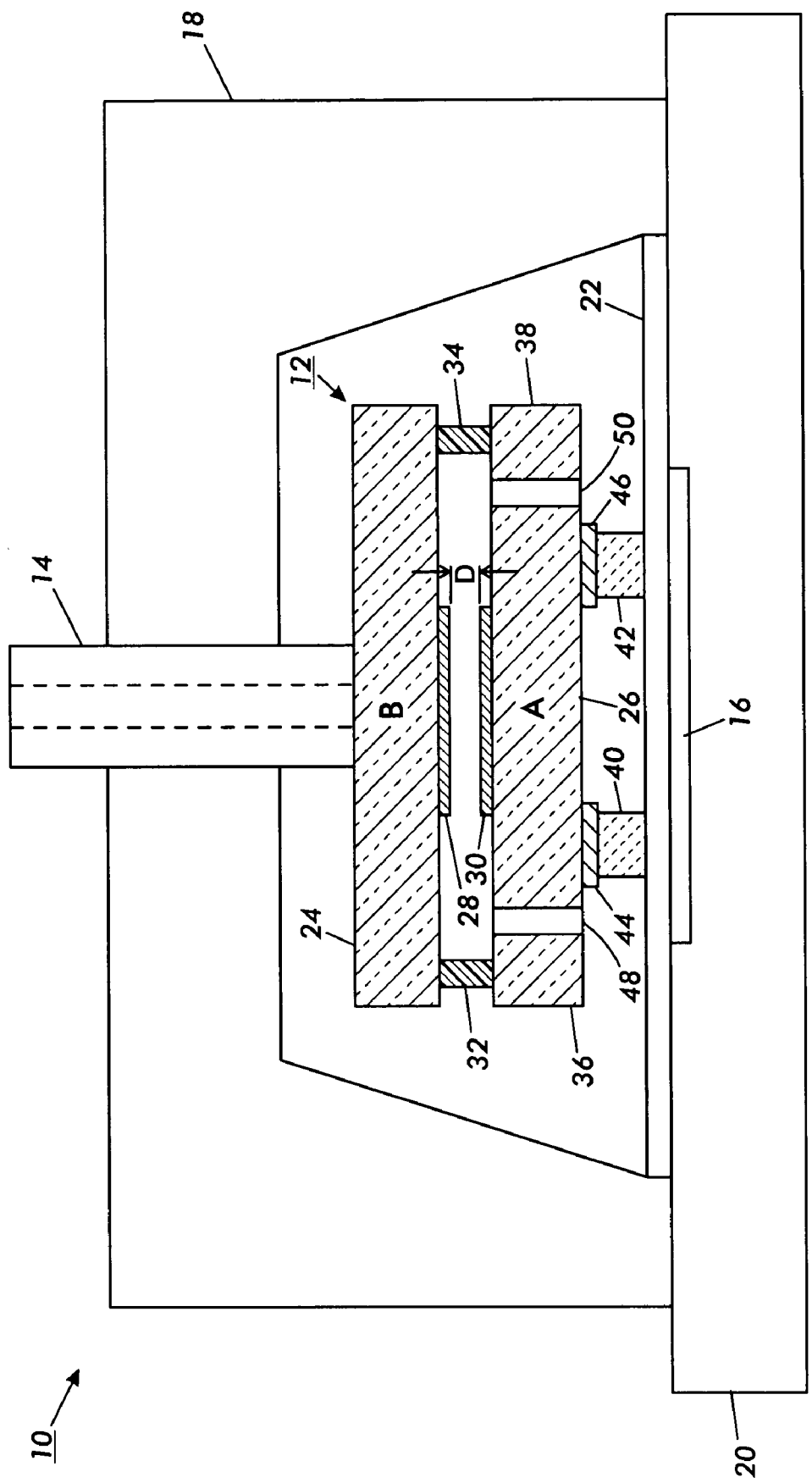
FIG. 1 illustrates a Fabry-Perot piezoelectric tunable spectrophotometer according to an exemplary embodiment of this disclosure.

With reference to FIG. 1, illustrated is a F-P piezoelectric tunable spectrophotometer according to an exemplary embodiment of this disclosure. One application of this spectrophotometer includes the detection of color associated with a printing system.

The spectrophotometer 10 is composed of a F-P filter 12, a photodetector 16, a substrate 20, a silicon wafer 18 and an optical fiber 14. The F-P filter 12 is composed of two reflective mirrors 28 and 30 which are attached to substrates 24 and 26, respectively, where the reflective mirrors 28 and 30 form an air gap of distance d to provide spectral filtering. In order to provide tunability of the air gap distance d, piezoelectric materials 40 and 42 are attached to electrodes 44 and 46, respectively, which are attached to substrate 26. Electrodes 44 and 46 can be electrically connected to substrate 20 (not shown in FIG. 1) and can be electrically controlled through substrate 20. The piezoelectric materials 40 and 42 are connected electrically using conductive adhesives (not shown in FIG. 1) such as silver-containing epoxy resins to transparent electrode 22 which is fixed to substrate 20. The conductive adhesives can have thickness from about 0.2 microns to about 30 microns to allow piezoelectrical materials to change dimensions under actuation.

In operation, a voltage is applied to electrodes 44 and 46 which causes the piezoelectric materials 40 and 42 to increase or decrease air gap d.

Other features of the spectrophotometer illustrated in FIG. 1 include spacers 32 and 34, substrates 36 and 38, and elastic supports 48 and 50. The substrates may be made of glass or silicon or other materials that allow light at the wavelengths of interest to be detected by the photodetector 16.

Figure 2:
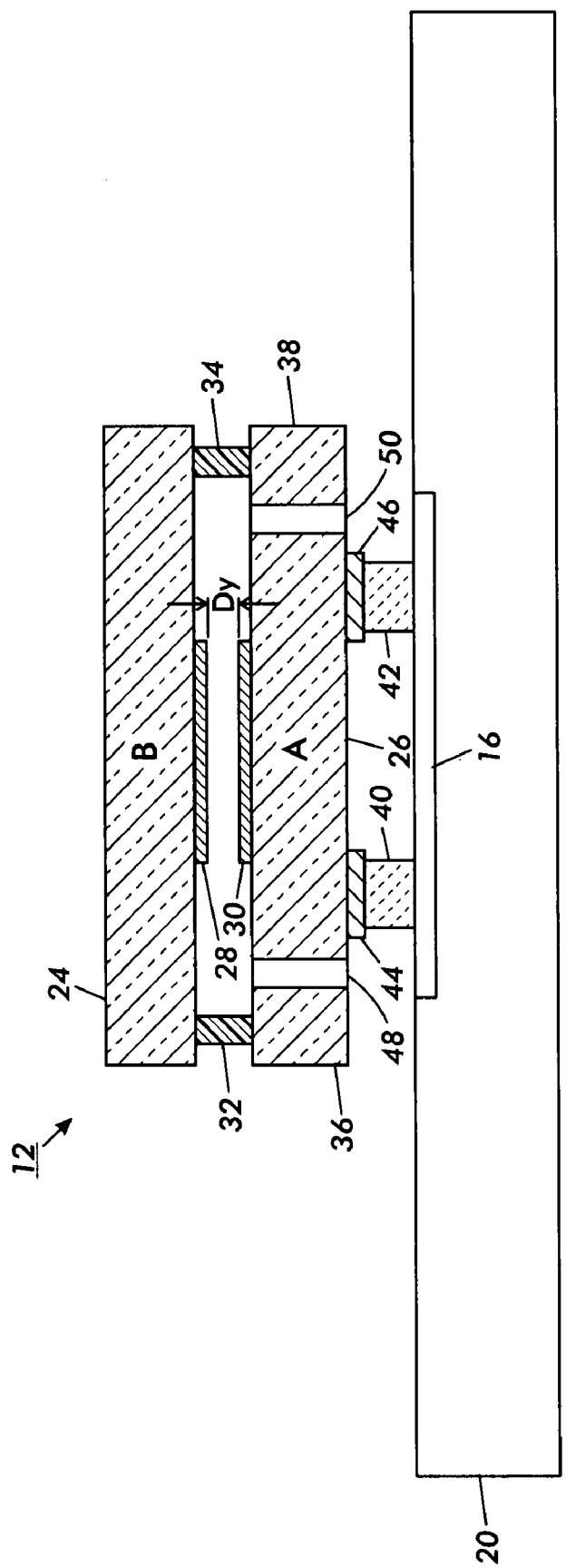
FIG. 2 illustrates a Fabry-Perot piezoelectric tunable spectrophotometer assembly according to an exemplary embodiment of this disclosure.

With reference to FIG. 2, illustrated is a detailed view of the F-P tunable filter used in the spectrophotometer 10 illustrated in FIG. 1. Notably, the F-P tunable filter includes two reflective mirrors 28 and 30, and the air gap d between the mirrors 28 and 30 is changed by the piezoelectric actuators which are comprised of strips of piezoelectric material 40 and 42 and conductors 44 and 46 which act as electrodes.

With reference to FIG. 3, illustrated is a detailed view of a silicon wafer 18 according to an exemplary embodiment of this disclosure. The silicon wafer includes a recess which is etched in the wafer using either a dry or wet etch. The recess has a depth of about 20 mm according to the exemplary embodiment and lithographic patterning is performed prior to etching the circular hole 21 which is used to guide an optical fiber 14 to direct light through to the F-P filter to the photodetector.

Figure 4:
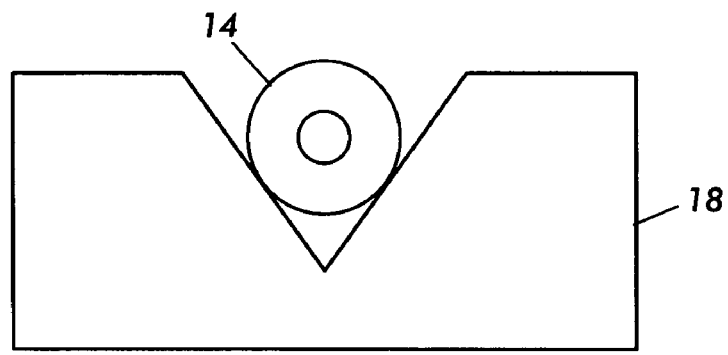
FIG. 4 illustrates an optical fiber and silicon wafer arrangement according to an exemplary embodiment of this disclosure.

With reference it FIG. 4, illustrated is a view of another silicon wafer 18 according to an exemplary embodiment of this disclosure.

In this embodiment, a V-groove is etched into the silicon wafer 18 and an optical fiber 14 is mounted in the V-groove.

Figure 5:
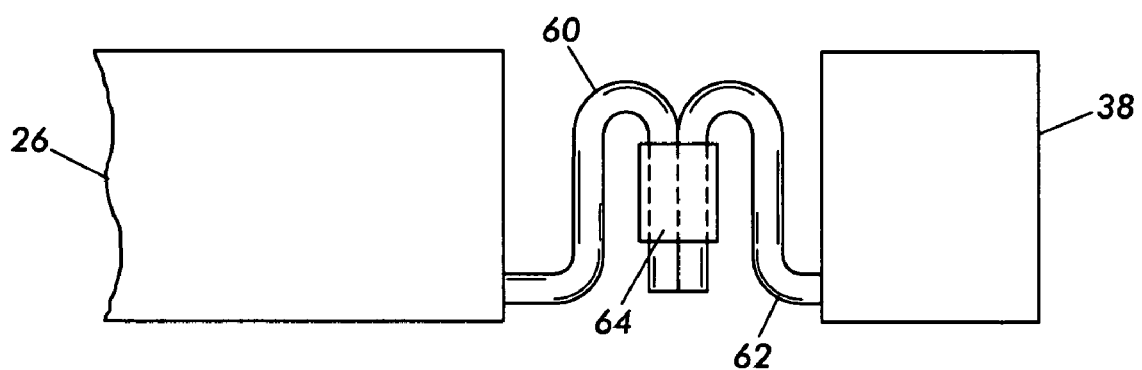
FIG. 5 illustrates a means for attaching a substrate to another substrate according to an exemplary embodiment of this disclosure.

With reference to FIG. 5, illustrated is a means for attaching substrate 26 to another substrate 38 according to an exemplary embodiment of this disclosure. The attachment means comprises a first spring member and a second spring member attached together with a crimp 64. The substrate attachment means provides an elastic coupling of the substrates where substrate 26 can be controllably displaced vertically trans-fixed substrate 28 during tuning of the F-P filter 12.

Figure 6A:
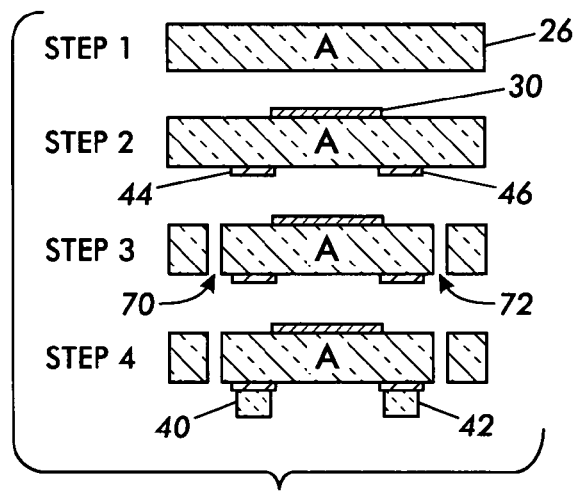
FIGS. 6A-6C illustrate an exemplary method of manufacturing a Fabry-Perot piezoelectric tunable filter according to this disclosure.
Figure 6B:
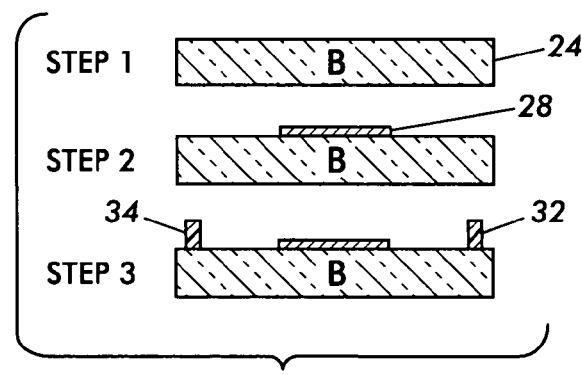
Figure 6C:
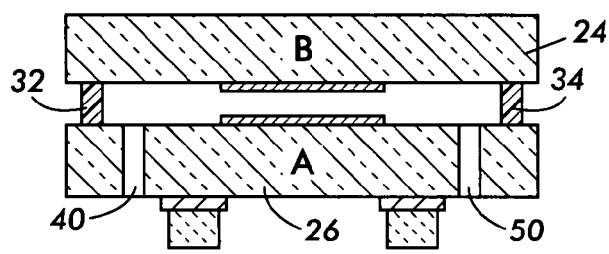

With reference to FIGS. 6A-6C, illustrated is an exemplary method of manufacturing a F-P piezoelectric tunable spectrophotometer according to an exemplary embodiment of this disclosure.

With reference to FIG. 6A, illustrated is a method of manufacturing the moveable part of the F-P piezoelectric spectrophotometer illustrated in FIG. 5. Initially, during step 1, a substrate 26 of glass or quartz is produced. Glass or quartz are typically used because they are transparent in the visual light range. Notably, unlike conventional electrostatic F-P devices, the substrate 26 does to need to be recess cut, which eliminates a process step.

During step 2, metal layer 30, 44 and 46 are deposited on substrate 26 by a metal deposition process. The function of these metal layers is electrical conduction and optical reflection. According to the exemplary embodiment, the metal contact layers 44 and 46 comprise about 300 Å Cr and 5000 Å gold. Another material suitable for the metal layers is Aluminum. Other technology available for producing the required optical reflectivity is the deposition of distributed Bragg reflectors (DBR). One method of producing a DBR is disclosed in U.S. patent publication No. 2006/0221450. An acceptable range of metal layer 30 thicknesses is 50 Å to 400 Å where the metal layers are thick enough to achieve a moderate reflectivity, but still thin enough for some light to pass through the P-metal layer. Transmission of light through the metal layer 30 is required to achieve optical resonance in the F-P cavity.

During step 3, removal of substrate material by etching produces areas 70 and 72. One process to produce the through substrate areas is deep reactive ion etching (DRIE) and another is wet etching through the wafer. Notably, DRIE is a single wafer process and it can take several hours to etch through a 600 μm wafer. While feasible, etch times that long using a serial process make the process expensive. One method of wet etching is disclosed in U.S. patent application Ser. No. 11/405,774, filed Apr. 18, 2006 by Lin et al. Wet etching has the advantage that many wafers can be etched in parallel.

During step 4, piezoelectric materials 40 and 42 are deposited on the underside of substrate 26. This can be accomplished with a shadow mask as the piezoelectric materials are deposited. Alternatively, patterned piezoelectric materials may be transferred from another substrate. Notable, it is possible to deposit the piezoelectric materials 40 and 42 before the substrate etching step in step 3.

With regard to the piezoelectric materials, acceptable materials include ZnO (zinc oxide), AlN (aluminum nitride) and PZT (lead zirconate titanate) as well as others. There are several methods for depositing the piezoelectric materials, including but not limited to, sputtering and screen printing.

With reference to FIG. 6B, illustrated is a method of manufacturing the top member of the F-P piezoelectric device illustrated in FIG. 1. Notably, step 1 may be performed as step 1 of FIG. 6A is performed, and step 2 bay be performed as step 2 of FIG. 6A is performed.

During the fabrication of the top member, as illustrated in FIG. 6B, initially during step 1, a substrate 24 is produced of glass or quartz, or other suitable material. Glass or quartz are suitable materials because they are transparent to the visible light.

During step 2, metal layer 28 is deposited on the substrate 24 using techniques as described with reference to metal layers 30, 44 and 46 in FIG. 6A.

During step 3, spacers 32 and 34 are deposited on substrate 24. The thickness of the spacers provides the active optical gap. In order to sweep the entire desired wavelength range from 400-800 mm, the optical gap range must be 0.2-0.4 mm. In other words, half the wavelength range because light traverses the gap twice. Any variations in the spacer thickness and other processing steps can be corrected for by applying a correction to the voltage applied to the piezoelectric materials 40 and 42. Acceptable spacer material includes conducting films, such as aluminum and gold, and insulating films such as silicon dioxide and silicon nitride.

With reference to FIG. 6C, illustrated is the final manufacturing step of the F-P piezoelectric device illustrated in FIG. 1. During this final step, substrate 26 is bonded to substrate 24 with spacers 32 and 34 in between by means of soldering, wafer bonding, polymeric adhesives, or other suitable bonding technology.

Figure 7:
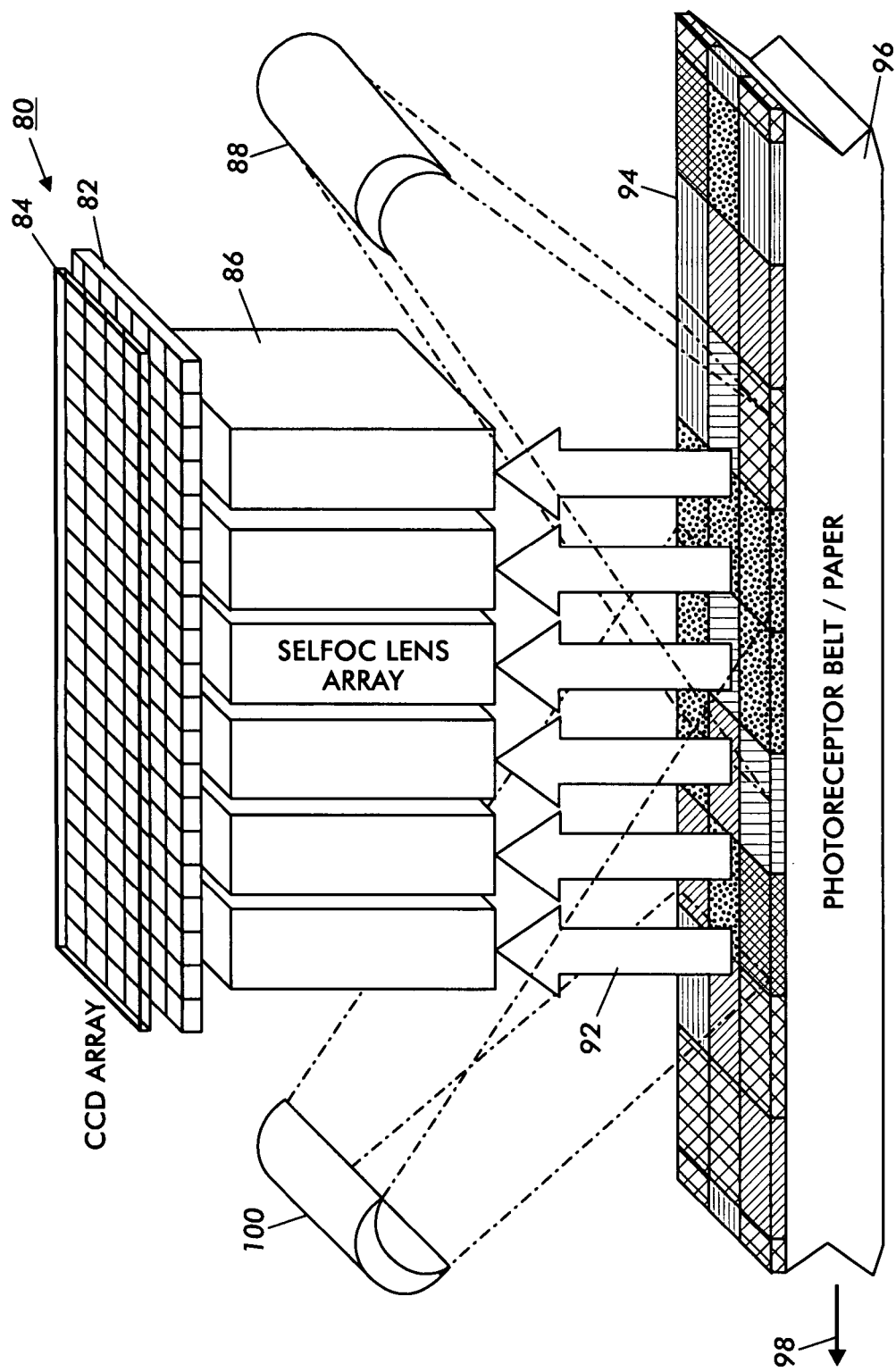
FIG. 7 illustrates a Fabry-Perot piezoelectric tunable spectrophotometer system according to an exemplary embodiment of this disclosure.

With reference to FIG. 7, illustrated is a printing system application of a F-P piezoelectric device as disclosed herein. The printing system comprises a F-P optical system 80 including an optical F-P piezoelectric filter array 82, a light sensing array 84, and an optical lens.

Illumination sources 88 and 100 direct light to a photoreceptor belt/paper associated with a printing system. The photoreceptor belt/paper 96 carries an image to be measured by the F-P optical system 80. The photoreceptor belt/paper travels in the direction illustrated 98. Light transmitted from the illumination sources 88 and 100 is reflected by spot color patches 94 of toner or ink carried by the photoreceptor belt/paper. The reflected light is directed to the F-P piezoelectric filter array 82 by the lens array 86. The F-P piezoelectric filter array is controlled to filter specific wavelengths of color for detection by the light sensing array 84. Control of the F-P piezoelectric filters associated with the array is provided by applying predetermined voltages to the piezoelectric materials to control the optical resonance air gap distance.

Figure 8:
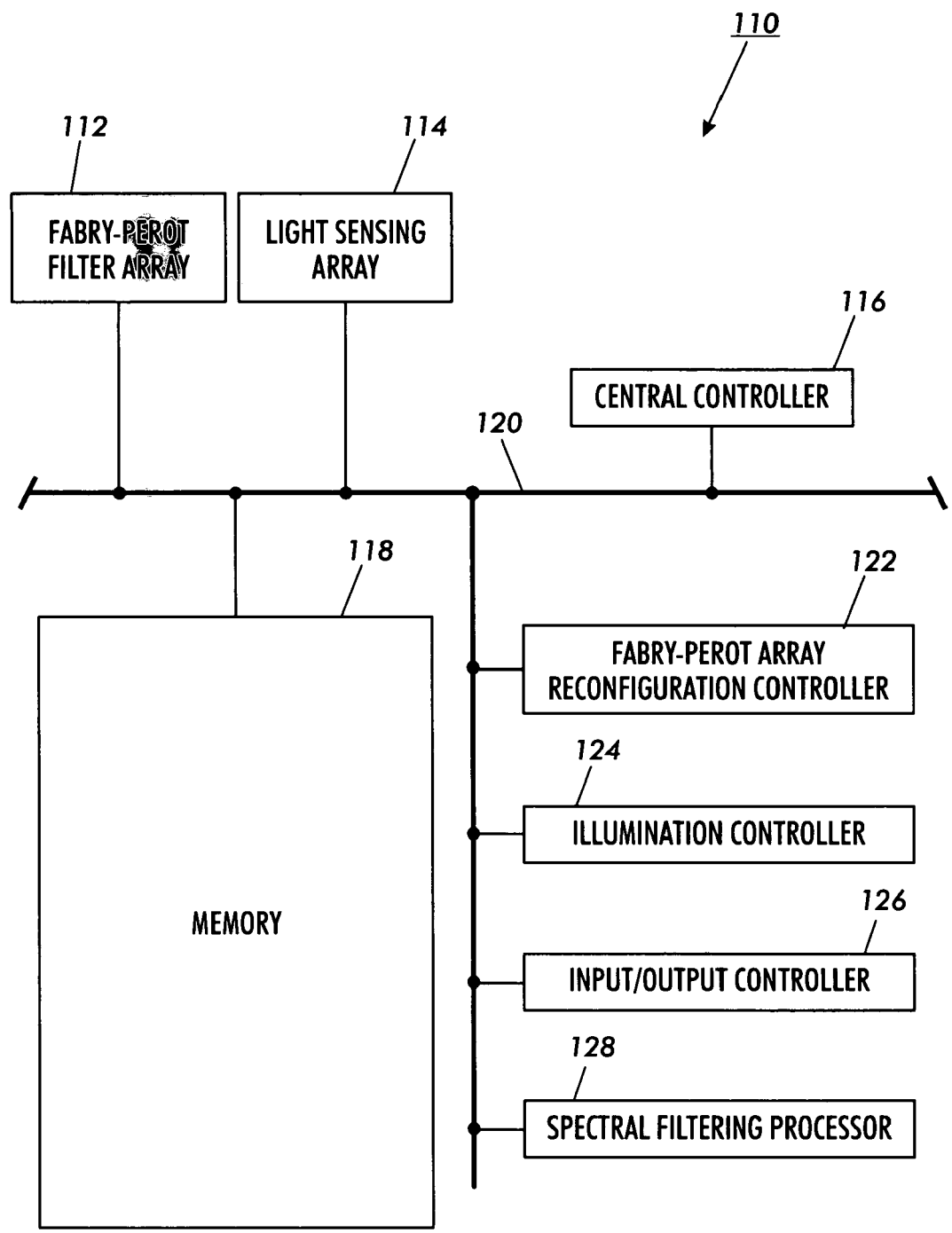
FIG. 8 illustrates a Fabry-Perot piezoelectric tunable spectrophotometer system according to an exemplary embodiment of this disclosure.

With reference to FIG. 8, illustrated is a block diagram of a F-P piezoelectric optical system 110 according to an exemplary embodiment of this disclosure.

The F-P piezoelectric optical system 100 comprises a central controller 116, a F-P filter array 112, a light sensing array 114, a computer/controller memory 118, a F-P Array Reconfiguration Controller 122, an Illumination Controller 124, an Input/Output Controller 126, a Spectral Filtering Processor 128, and a bus to provide integration of the F-P piezoelectric optical system 110.

Attributes associated with a F-P piezoelectric actuated filter device as disclosed herein include a (1) full range of actuation from 10 nm to 400 nm as opposed to electrostatic activated F-P devices where the electrodes may collapse as the gap distance decreases due to runaway electrostatic attraction, (2) there is no need to have an etching step for a recess as in electrostatic actuators, (3) the piezoelectric actuator can produce more force per unit area and requires less space, as compared to an electrostatic actuator, (4) stronger mechanical arms can be used to support the mirror to prevent electrical shorting from vibration, and (5) no breakdown or shorting occurs between the mirrors at small gap distances because there is no electrical field between the mirrors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A microelectromechanically tunable Fabry-Perot device comprising:
    a first bottom member comprising a first substrate, a partially reflective planar surface attached to a top surface of the first substrate, and one or more piezoelectric members attached to a bottom surface of the first substrate;
    a second bottom member longitudinally aligned with the first bottom member and proximately located at a first longitudinal end of the second bottom member;
    a third bottom member longitudinally aligned with the first bottom member and proximately located at a second longitudinal end of the second bottom member;
    a top member comprising a second substrate and a partially reflective planar surface attached to a bottom surface of the second substrate,
    wherein the first substrate partially reflective planar surface and the second substrate partially reflective planar surface are separated by a separation distance and aligned to provide a Fabry-Perot cavity, and the one or more piezoelectric members are adapted to displace the first substrate relative to the second substrate when an electric field is applied to the one or more piezoelectric members;
    one or more spacers to separate the first and second substrates a predetermined fixed distance whereby only one end of each spacer is permanently attached to one of the second substrate, the second bottom member and the third bottom member; and
    first and second elastic members distinct from the one or more piezoelectric members, the first elastic member operatively coupled to the first bottom member and the second bottom member, and the second elastic member operatively coupled to the first bottom member and the third bottom member, wherein the one or more elastic members dampen and restrict the lateral and vertical displacement of the first substrate relative to the second substrate.

2. The microelectromechanically tunable Fabry-Perot device according to claim 1, further comprising:
    a photodetector aligned to detect a predetermined spectrum of light which passes through the Fabry-Perot cavity, wherein the distance between the first substrate partially reflective planar surface and the second substrate partially reflective planar surface determines the predetermined spectrum of light.

3. The microelectromechanically tunable Fabry-Perot device according to claim 1, further comprising:
    a first piezoelectric strip operatively connected to a first electrode; and
    a second piezoelectric strip operatively connected to a second electrode.

4. The microelectromechanically tunable Fabry-Perot device according to claim 3, further comprising:
    a third electrode operatively connected to the first piezoelectric strip, wherein the first and third electrodes are located on opposite surfaces of the first piezoelectric strip; and
    a fourth electrode operatively connected to the second piezo electric strip, wherein the second and fourth electrodes are located on opposite surfaces of the second piezoelectric strip.

5. The microelectromechanically tunable Fabry-Perot device according to claim 3, further comprising:
    a third electrode operatively connected to the first and second piezoelectric strip, wherein the first and third electrodes are located on opposite surfaces of the first piezoelectric strip, and the second and third electrodes are located on opposite surfaces of the second piezoelectric strip.

6. The microelectromechanically tunable Fabry-Perot device according to claim 5, wherein the third electrode is transparent to light.

7. The microelectromechanically tunable Fabry-Perot device according to claim 1, wherein the one or more elastic members comprise one or more springs.

8. The microelectromechanically tunable Fabry-Perot device according to claim 1, further comprising:
an optical fiber,
a silicon wafer adapted to align the optical fiber for routing of light to a surface of the second substrate; and
a base substrate wherein the one or more piezoelectric members are attached to the base substrate, and the silicon wafer is attached to the base substrate.

* * * * *